United States Patent
He et al.

(10) Patent No.: US 10,599,271 B2
(45) Date of Patent: Mar. 24, 2020

(54) ULTRASONIC TOUCH DEVICE AND DISPLAY DEVICE

(71) Applicants: BOE TECHNOLOGY GROUP CO., LTD., Beijing (CN); Hefei Xinsheng Optoelectronics Technology Co., Ltd., Hefei, Anhui (CN)

(72) Inventors: Xiaoyue He, Beijing (CN); Taofeng Xie, Beijing (CN); Wenjin Fan, Beijing (CN); Zhao Dong, Beijing (CN)

(73) Assignees: BOE TECHNOLOGY GROUP CO., LTD., Beijing (CN); Hefei Xinsheng Optoelectronics Technology Co., Ltd., Hefei, Anhui (CN)

(*) Notice: Subject to any disclaimer, the term of this patent is extended or adjusted under 35 U.S.C. 154(b) by 0 days.

(21) Appl. No.: 16/055,608

(22) Filed: Aug. 6, 2018

(65) Prior Publication Data

US 2019/0204991 A1 Jul. 4, 2019

(30) Foreign Application Priority Data

Jan. 4, 2018 (CN) .......................... 2018 1 0006978

(51) Int. Cl.
*G06F 3/041* (2006.01)
*G06F 3/043* (2006.01)

(52) U.S. Cl.
CPC .......... *G06F 3/0436* (2013.01); *G06F 3/0412* (2013.01); *G06F 3/0416* (2013.01)

(58) Field of Classification Search
CPC ........ G06F 3/041; G06F 3/0412; G06F 3/043; G06F 3/0433; G06F 3/0436
See application file for complete search history.

(56) References Cited

U.S. PATENT DOCUMENTS

| | | | |
|---|---|---|---|
| 2007/0091074 A1* | 4/2007 | Nashiki | B32B 3/085 345/173 |
| 2009/0104440 A1* | 4/2009 | Nashiki | C08J 7/045 428/336 |
| 2013/0271675 A1* | 10/2013 | Misaki | G06F 3/044 349/12 |
| 2014/0370275 A1* | 12/2014 | Kuchiyama | C23C 14/086 428/336 |
| 2015/0309637 A1* | 10/2015 | Sakuishi | G06F 3/0412 345/174 |
| 2017/0045645 A1* | 2/2017 | Fujino | B32B 9/00 |
| 2017/0216887 A1* | 8/2017 | Song | B06B 1/0622 |
| 2018/0090398 A1* | 3/2018 | Park | G02F 1/1309 |
| 2018/0189539 A1* | 7/2018 | Chen | G06F 3/043 |
| 2018/0364822 A1* | 12/2018 | Taya | G06F 3/017 |

* cited by examiner

*Primary Examiner* — Joe H Cheng
(74) *Attorney, Agent, or Firm* — Foley & Lardner LLP (57) ABSTRACT

The present disclosure provides an ultrasonic touch device and a display device. The ultrasonic touch device includes a touch layer, having a plurality of probes fixedly disposed on a first side thereof, the plurality of probes being perpendicular to the touch layer; an interlayer disposed on the first side of the touch layer, the plurality of probes penetrating the interlayer and extend from the first side of the touch layer to a second side of the interlayer; a dielectric layer disposed on the second side of the interlayer, and an ultrasonic transceiver disposed at a periphery of the dielectric layer, configured to transmit a detecting ultrasonic wave to the dielectric layer and receive the reflected ultrasonic wave after the detecting ultrasonic wave is reflected.

18 Claims, 3 Drawing Sheets

Fig. 4

ULTRASONIC TOUCH DEVICE AND DISPLAY DEVICE

CROSS REFERENCE

This application is based upon and claims priority to Chinese Patent Application No. 201810006978.7, filed on Jan. 4, 2018, the entire contents thereof are incorporated herein by reference.

TECHNICAL FIELD

The present disclosure relates to the field of display technology, and in particular to an ultrasonic touch device and a display device.

BACKGROUND

With rapid development of the display technology, display devices have been widely used in various technical fields, and touch products have been paid with more and more attentions.

In display devices in the related art, a touch function is generally realized by detecting a change in internal capacitance or resistance of the display panel. However, when there is a strong electromagnetic field signal in the environment where the display device is being used, the electromagnetic field signal may change the internal capacitance or resistance in the display panel, and then interfere with the detection result of capacitance or resistance inside the display panel, and thus accuracy and sensitivity of the detection is reduced, thus adversely affecting touch effect and user experience.

SUMMARY

According to some arrangements of the present disclosure, an ultrasonic touch device includes: a touch layer having a plurality of probes fixedly disposed on a first side thereof, the plurality of probes being perpendicular to the touch layer, an interlayer disposed on the first side of the touch layer, the plurality of probes penetrate the interlayer and extend from the first side of the touch layer to a second side of the interlayer, a dielectric layer disposed on the second side of the interlayer, and an ultrasonic transceiver disposed at a periphery of the dielectric layer, configured to transmit a detecting ultrasonic wave to the dielectric layer and receive the reflected ultrasonic wave after the detecting ultrasonic wave is reflected.

In an exemplary arrangement of the present disclosure, the touch layer and the plurality of probes are made of elastic material, and when the second side of the touch layer is pressed, the touch layer is deformed so that at least one of the plurality of probes disposed on the first side of the touch layer enters the dielectric layer, and the first side of the touch layer is opposite to the second side.

In an exemplary arrangement of the present disclosure, the touch layer is integrally formed with the plurality of probes and the plurality of probes may be cylinder-shaped.

In an exemplary arrangement of the present disclosure, the dielectric layer includes a liquid medium. The dielectric layer may have a thickness of 0.2 mm to 2 mm.

In an exemplary arrangement of the present disclosure, the liquid medium is water.

In an exemplary arrangement of the present disclosure, the liquid medium is silicone oil.

In an exemplary arrangement, the ultrasonic transceiver comprises a plurality of ultrasonic wave ranging units that are linearly arranged. Alternatively, the plurality of ultrasonic wave ranging units may also be arranged in a matrix.

In an exemplary arrangement, the ultrasonic touch device may further comprise a touch information determining module and a timer, the ultrasonic transceiver transmits the ultrasonic wave to the dielectric layer in response to the touch layer being pressed, and at the same time, the timer starts timing, when the ultrasonic transceiver receives the ultrasonic wave reflected by the at least one probe in the dielectric layer, the timer stops timing, and the touch information determining module calculates a position of the at least one probe in the dielectric layer according to the timing to determine a pressed position.

In an exemplary arrangement, the touch information determining module comprises a first position determining unit and a second position determining unit, respectively configured to determine a position of the at least one probe entering the dielectric layer in a first direction and a second direction according to a position of the ultrasonic wave ranging unit in the ultrasonic transceiver, which receives the reflected ultrasonic wave, the first direction and the second direction being perpendicular to each other in a plane of the dielectric layer.

In an exemplary arrangement of the present disclosure, the ultrasonic transceiver includes: a first ultrasonic transceiver unit and a second ultrasonic transceiver unit. The first ultrasonic transceiver unit and the second ultrasonic transceiver unit are respectively disposed on two adjacent sides of the dielectric layer.

In an exemplary arrangement of the present disclosure, the ultrasonic touch device further includes: a touch information determining module configured to determine touch information according to the detecting ultrasonic wave and the reflected ultrasonic wave.

In an exemplary arrangement of the present disclosure, the ultrasonic touch device may further comprise a touch information determining module and a timer, the first ultrasonic transceiver unit and the second ultrasonic transceiver unit transmits the ultrasonic wave to the dielectric layer in response to the touch layer being pressed, and at the same time, the timer starts timing, when the first ultrasonic transceiver unit and the second ultrasonic transceiver unit receive the ultrasonic wave reflected by the at least one probe entering in the dielectric layer, the timer stops timing, and the touch information determining module calculates a position of the at least one probe in the dielectric layer according to the timing to determine a pressed position.

In an exemplary arrangement, the interlayer is made of organics.

According to some arrangements of the present disclosure, a display device including the ultrasonic touch device as aforesaid.

In an exemplary arrangement of the present disclosure, a size of the display device is greater than 50 inches.

BRIEF DESCRIPTION OF THE DRAWINGS

The accompanying drawings, which are incorporated in the specification and constitute part of the present specification, show arrangements in accordance with the present disclosure, and explain principle of the present disclosure together with this specification. It is obvious for those ordinary skill in the art that the accompanying drawings in the following description are merely some arrangements of the present disclosure, and other drawings may also be obtained by these drawings without any creative work.

DETAILED DESCRIPTION

Exemplary arrangements will now be described more fully with reference to the accompanying drawings. The exemplary arrangements can be embodied in a variety of forms, and should not be construed as being limited to the examples set forth herein. The described features, structures, or characteristics may be combined in any suitable manner into one or more arrangements. In the following description, numerous specific details are set forth to fully understand the arrangements of the present disclosure. However, one skilled in the art will should appreciate that one or more of the specific details may be omitted or other methods, components, devices, steps and the like may be employed when implementing technical solutions of the arrangements of the present disclosure.

It is pointed out that, in the drawings, dimensions of layers and regions may be exaggerated for clarity of illustration. It should be also understood that when an element or layer is referred to as being "on" another element or layer, it may be directly on another element or an intermediate layer may be present. In addition, it should be understood that when an element or layer is referred to as being "under" another element or layer, it may be directly under another element or more than one intermediate layers or elements may be present. In addition, it should also be understood that when a layer or element is referred to as being "between" two layers or two elements, it may be a single layer between two elements or two layers, or more than one intermediate layers or elements may be present. Like reference numerals indicate like elements throughout.

The present disclosure provides a technical solution for manufacturing an ultrasonic touch screen by using elastic probes.

The commonly used ultrasonic probe is a device that uses an ultrasonic wave (above 20,000 Hz), which is inaudible to the human ear, as detection source to detect, and is generally used for detecting moving objects. The working principle of the ultrasonic detector is to measure a distance by transmitting ultrasonic waves, reflecting the ultrasonic waves of the measured object, and calculating a time difference between transmitting and receiving after receiving the echo. The ultrasonic detector is a kind of non-contact measuring instrument.

In the related art, the ultrasonic transmitter transmits an ultrasonic wave in a certain direction, and starts timing at the time of transmission. When the ultrasonic wave encounter obstacles in the air during transmission, the timing immediately stops once the ultrasonic receiver receives the reflected wave. A propagation speed of the ultrasonic wave in the air is 340 m/s, and a distance (s) of a transmission point from the obstacle can be calculated according to the time t recorded by a timer, that is, s=340t/2. This is the so-called time difference ranging method. As the ultrasonic wave has the advantages of easy directional transmission, good directionality, easy control of strength, and no direct contact with the object to be measured, the ultrasonic ranging method can theoretically be an ideal means for measuring a height of liquid.

In a precise liquid level measurement, it is often necessary to achieve millimeter-sized measurement accuracy, but in the currently related art, the ultrasonic ranging ASICs generally have centimeter-sized measurement accuracy only.

At present, one solution in the prior art is to improve the measurement accuracy for time difference by analyzing the reason of the ultrasonic ranging error, and using the LM92 temperature sensor to compensate a propagation speed of an acoustic wave, thus generating a high-precision ultrasonic rangefinder which may achieve the millimeter-sized measurement accuracy. However, this technology has a problem that it is difficult to mass produce.

On one hand, the ultrasonic surface touch in the related art applies ultrasonic waves to a glass surface without other dielectric layers. This solution has problems such as high noise, inaccurate signal reception, and slow response speed. On the other hand, in the related art, it is difficult to achieve mass production for a high-precision, large-sized touch screen.

The present disclosure provides a technical solution for manufacturing an ultrasonic touch screen using elastic probes. Thus, it is advantageous in that the structure is simple, mass production is easy, and high-precision ultrasonic range measurement can be realized without using an additional temperature sensor. The description thereof will be made below with reference to the accompanying drawings.

Figure 1:
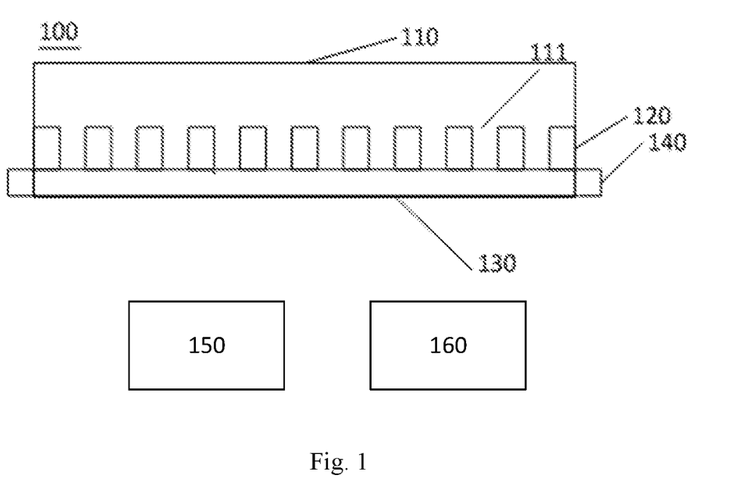
FIG. 1 shows a cross-sectional view of an ultrasonic touch device in an exemplary arrangement of the present disclosure.
Figure 2:
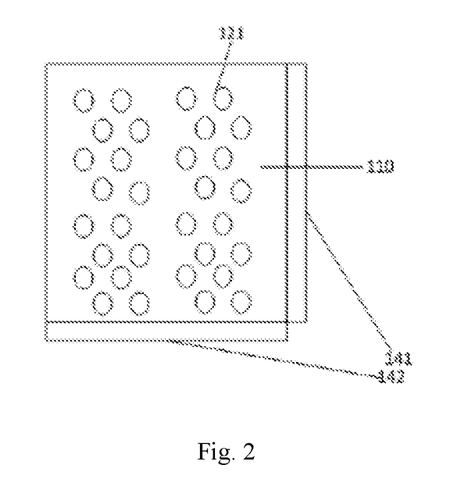
FIG. 2 shows a top view of an ultrasonic touch device in an exemplary arrangement of the present disclosure.
Figure 3:
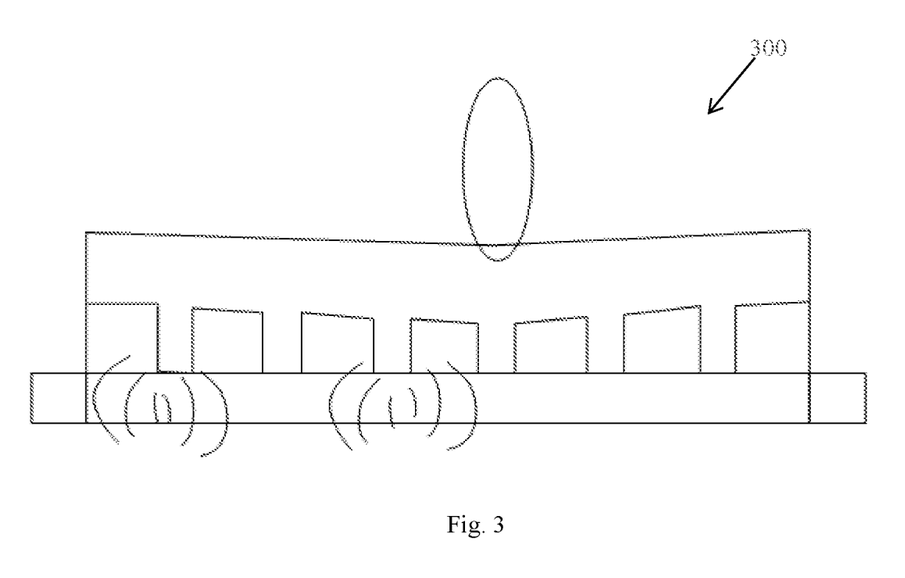
FIG. 3 shows a reference diagram for use state of an ultrasonic touch device in an exemplary arrangement of the present disclosure.

FIG. 1 shows a cross-sectional view of an ultrasonic touch device in an exemplary arrangement of the present disclosure, FIG. 2 shows a top view of the ultrasonic touch device, and FIG. 3 shows a reference diagram for use state of an ultrasonic touch device 300 in an exemplary arrangement of the present disclosure.

As shown in FIGS. 1-3, the ultrasonic touch device 100 may include: a touch layer 110, with probes 111 disposed on a first side of the touch layer, an interlayer 120 which may be dispose under the touch layer 10 so that the interlayer 120 is embedded in the gaps between the probes 111 on the first side of the touch layer 110 (for example, a lower side of the touch layer 110 shown in FIG. 1, but the disclosure is not limited thereto), a dielectric layer 130 which may be disposed under the lower side of the interlayer 120, and an ultrasonic transceiver 140, which may be disposed at a periphery of the dielectric layer 130, and may be configured to transmit a detecting ultrasonic wave to the dielectric layer 130 and receive a reflected ultrasonic wave after the detecting ultrasonic wave is reflected.

In an exemplary arrangement, the touch layer 110 and the probes 111 may be integrally formed by using elastic material.

The elastic material may be, for example, polystyrene. However, the present disclosure is not limited thereto, and any elastic membrane material layer structure may be used in the present disclosure.

When a touch object such as a finger presses the second side of the touch layer 110 (for example, an upper side shown in FIG. 1, but the disclosure is not limited thereto), at least one probe 111 of the first side of the touch layer 110 enters the dielectric layer 130. The ultrasonic transceiver 140 is disposed under the elastic probe material, as shown in FIG. 1.

It should be noted that both small pillars and the probes 111 in the arrangement of the present disclosure refer to cylindrical structures formed from the elastic material. Among them, there is no special requirement for the height and diameter of these cylinders before they are pressed and deformed. Of course, the shape of the probe may be, but not limited to, a shape of needle or cylinder, and other suitable shapes of probes such as a rectangular parallelepiped, a cube, or the like may be used in the present disclosure, too.

The interlayer 120 may have holes or apertures 121. For example, a cylindrical probe 111 may be formed on the first side of the touch layer 110, and then the interlayer 120 having the hole may be embedded in the first side of the touch layer 110, so that a position of the hole 121 corresponds to a position of the probe 111.

In some arrangements, the interlayer 120 may be an organic interlayer with apertures. However, it should be noted that there is no material limitations to the interlayer 120 as long as it may formed with apertures or holes.

In an exemplary arrangement, the dielectric layer 130 includes a liquid medium with a predetermined thickness.

In the arrangement of the present disclosure, the thickness of the dielectric layer 130 is not specifically limited. The predetermined thickness may be between 0.2 mm and 2 mm, but the disclosure is not limited thereto.

It should be noted that the dielectric layer 130 may be any liquid medium or gaseous medium.

In a first arrangement, the liquid medium may be water.

In some arrangements, the dielectric layer 130 may accelerate the ultrasonic transmission speed by using water, thus achieving fast and accurate transmission, so that an elastic deformation material and a small probe may be used to enter the water for facilitating accurate ultrasonic detection. On the other hand, the position of the small probe which is mechanically deformed is recognized by using the ultrasonic wave as a detecting means, thus achieving fast detection. Also, the cost is low as the water is used as a medium, and the device works well.

In a second arrangement, the liquid medium may be silicone oil.

The dielectric layer such as silicone oil may accelerate the ultrasonic transmission speed, thus achieving fast and accurate transmission. At the same time, the silicone oil has a higher boiling point than water and may be used in a harsh environment with high temperature.

In an exemplary arrangement, the ultrasonic wave transceiver 140 may include a first ultrasonic transceiver unit 141 and a second ultrasonic transceiver unit 142.

Referring to the arrangement shown in FIG. 2, the first ultrasonic transceiver unit 141 and the second ultrasonic transceiver unit 142 may be respectively disposed on two adjacent sides of the dielectric layer 130. Optionally, the first ultrasonic transceiver unit 141 and the second ultrasonic transceiver unit 142 may be respectively disposed on two opposite sides of the dielectric layer 130, or may be disposed on same side of the dielectric layer 130 according to actual requirements, the present disclosure is not limited thereto.

In the arrangement of the present disclosure, the ultrasonic transceiver 140 is arranged on two adjacent sides of the frame of the dielectric layer and its top view is as shown in FIG. 2. Two adjacent sides of the ultrasonic transceiver 140 may simultaneously transmit and receive the ultrasonic wave, which may be used to locate X-axis and Y-axis coordinates of a touch position.

It should be noted that, in the above arrangement, the first ultrasonic transceiver unit 141 and the second ultrasonic transceiver unit 142 are respectively disposed on two adjacent sides of the dielectric layer 130 as an example, but the present disclosure is not limited thereto. For example, the first ultrasonic transceiver unit 141 and the second ultrasonic transceiver unit 142 may be disposed on two opposite sides of the dielectric layer. For another example, the ultrasonic transceiver 140 is disposed on the same side of the dielectric layer, that is, it is not distinguished by the first ultrasonic transceiver unit 141 and the second ultrasonic transceiver unit 142.

It should be understood that although the ultrasonic transceiver 140 in the above arrangement has both the ultrasonic transmitting function and the ultrasonic wave receiving function, that is, the ultrasonic transmitter and the ultrasonic receiver are integrated, but the present disclosure is not limited thereto. In other arrangements, the ultrasonic transceiver 140 may include an ultrasonic transmitter and an ultrasonic receiver, and the ultrasonic transmitter and the ultrasonic receiver are separated and not integrated.

In some arrangements, when the ultrasonic transmitter and the ultrasonic receiver are separated and not integrated, the ultrasonic transmitter and the ultrasonic receiver may be disposed on two opposite sides of the dielectric layer.

When the ultrasonic transmitter and the ultrasonic receiver are disposed on two opposite sides of the dielectric layer, an ultrasonic wave signal transmitted by the ultrasonic transmitter is transmitted through the dielectric layer and then received by the ultrasonic receiver on its opposite side.

In the arrangement of the present disclosure, the ultrasonic transmitter and the ultrasonic receiver are respectively disposed on two opposite sides of the dielectric layer, so that the ultrasonic wave signal transmitted by the ultrasonic transmitter is directly transmitted by the ultrasonic receiver on its opposite side after propagating through the dielectric layer. The time required by the ultrasonic receiver to receive the ultrasonic wave signal may be shortened, thus improving detection speed of the touch and thus improving touch sensitivity.

In other arrangements, the ultrasonic transmitter and the ultrasonic receiver may be disposed on the same side of the dielectric layer.

When the ultrasonic transmitter and the ultrasonic receiver are disposed on the same side of the dielectric layer, the ultrasonic wave signal transmitted by the ultrasonic transmitter reaches the pressed position during propagation process through the dielectric layer, and when the probe enters the dielectric layer due to deformation of the touch layer, the intensity of the ultrasonic wave signal changes. At this time, a part of the ultrasonic wave signal may be returned to the side where the ultrasonic transmitter and the ultrasonic receiver are located due to blocking of the touch object such as a finger, and is received by the ultrasonic receiver, for the rest of the ultrasonic wave signal which is not returned and continues to propagate, part thereof may be blocked by an obstacle during the propagation process and returned to the side where the ultrasonic transmitter and the ultrasonic receiver are located, and then may be received by the ultrasonic receiver. The obstacle may be a frame of the device or other inherent structure, which is not limited herein.

It should be noted that when the ultrasonic transmitter and the ultrasonic receiver are disposed on the same side of the dielectric layer, the ultrasonic transmitter and the ultrasonic receiver may be disposed separately or integrated. In order to reduce installation controls of the structure, the ultrasonic transmitter and the ultrasonic receiver of the arrangement of the present disclosure are integrated.

Arrangements of the present disclosure may save an arrangement space of the device by arranging the ultrasonic transmitter and the ultrasonic receiver on the same side of the dielectric layer.

It should be understood that the present disclosure does not limit the setting position and fixing manner of the ultrasonic transmitter and the ultrasonic receiver in the ultrasonic touch device, and enables the ultrasonic wave signal transmitted by the ultrasonic transmitter to be received by the ultrasonic receiver after propagating in the dielectric layer.

In an exemplary arrangement, the ultrasonic touch device 100 may further include: a touch information determining module 150 to determine touch information according to the detecting ultrasonic wave and the reflected ultrasonic wave.

In an exemplary arrangement, the touch information includes a touch location.

In the arrangement of the present disclosure, after the touch layer 110 is pressed, the elastic material deforms and the small pillar or the probe 111 enters the dielectric layer 130. The ultrasonic transceiver 140 transmits the detecting ultrasonic wave which is reflected when sensing the obstacle. The reflected ultrasonic wave is received and calculated to determine the pressed position or the touch position as shown in FIG. 3. A pressure touch point may be located after the X-axis and Y-axis coordinates are known.

Figure 4:
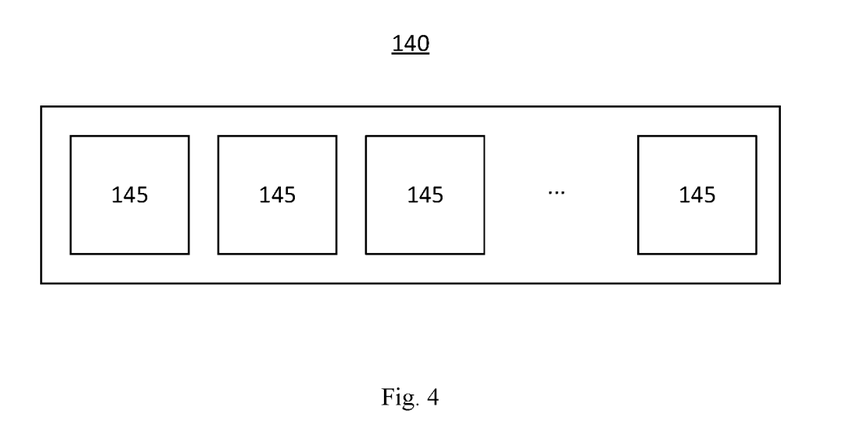
FIG. 4 shows a reference diagram of an ultrasonic transceiver of an ultrasonic touch device in an exemplary arrangement of the present disclosure.

In an exemplary arrangement, the ultrasonic transceiver 140 may include a plurality of ultrasonic wave ranging units 145 linearly arranged, configured to transmit the detecting ultrasonic wave to the dielectric layer and receive the reflected ultrasonic wave reflected by the probe entering the dielectric layer, and to record a time interval between transmitting of the detecting ultrasonic waves and receiving of the reflected ultrasonic waves, as shown in FIG. 4. FIG. 4 shows a reference diagram of an ultrasonic transceiver of an ultrasonic touch device in an exemplary arrangement of the present disclosure. Optionally, the plurality of ultrasonic wave ranging units 145 may also be arranged in a matrix or arranged in other shapes according to actual requirements.

In an exemplary arrangement, the touch information determining module 150 may include a first position determining unit, which may be configured to determine a distance from the probe entering the dielectric layer to the ultrasonic transceiver 140 according to the time interval and to determine a position of the probe entering the dielectric layer in a first coordinate direction of the touch layer (for example, a position in the y-axis direction) according to the distance.

In an exemplary arrangement, the touch information determining module 150 may further include a second position determining unit, which may be configured to determine a position of the probe entering the dielectric layer in a second coordinate direction of the touch layer (for example, a position in the x-axis direction) according to a position of the ultrasonic wave ranging unit 145, that receives the reflected ultrasonic wave, in the ultrasonic transceiver 140. It should be complemented that the direction of the x-axis may be parallel to one side of the touch layer, and the direction of the y-axis may be perpendicular to this side of the touch layer, therefore, it should be understood that the direction of the x-axis may be perpendicular to the direction of the y-axis.

In the above-mentioned ultrasonic touch device, on the one hand, a program corresponding to the coordinate can be performed according to coordinates of the probe entering the dielectric layer, thus achieving the touch function and improving user experience. On the other hand, the number of members of the ultrasonic touch device is smaller, so the manufacturing process is simple and the cost is low.

The ultrasonic touch device may be applied to an electronic device, and the electronic device may be an electronic device having a display function, for example, it may include a mobile phone, a display, a television, a notebook, or a tablet computer and the like, which is not particularly limited in this example. The touch object pressing the touch layer may include a common stylus such as a pencil, a pen, a ballpoint pen, a writing brush, an active pen, a passive pen and the like, and may also include ordinary daily necessities such as a toothpick, a cotton swab or a key, which is not particularly limited in this example.

The ultrasonic transceiver 140 of the ultrasonic touch device may be disposed at a periphery of the electronic device, for example, a non-display area under the display area in a manner of embedding, snapping, magnetically connecting or adhering, or may be directly disposed at the periphery of the electronic device, which is not particularly limited in this example. As the ultrasonic transceiver 140 is disposed on the periphery of the electronic device, there is no influence on the transmittance and display effect of the display area of the electronic device, thus improving the user experience. In addition, the device is disposed by sleeving or adhering, so that users may assemble or disassemble the device at any time, which is convenient and fast.

The distance between ultrasonic wave ranging units 145 may be differently provided according to different precisions, for example, the distance may be 0.2 mm in the exemplary arrangement.

In addition, the ultrasonic touch device 100 may further include a timer 160, which may be used to record a time interval from a time when the ultrasonic transmitter transmits the detecting ultrasonic wave to a time the ultrasonic receiver receives the reflected ultrasonic wave (the time interval may be denoted as T). The timer 160 may include an electromagnetic dot timer or a spark timer, etc., and may also include other timers such as a reaction timer or an amplification timer and the like, which is not particularly limited in this example. In addition, it should be complemented that the ultrasonic transmitter may transmit the detecting ultrasonic wave to the dielectric layer at a predetermined transmitting frequency (which, for example, may be 100 Hz, 100 times per second). Then, the ultrasonic receiver may be used to receive the reflected ultrasound wave reflected by the probe entering the dielectric layer.

The first position determining unit and the second position determining unit may be integrated in an MCU (microprocessor).

In the arrangement of the present disclosure, the ultrasonic transmitter can transmit the detecting ultrasonic wave to the dielectric layer at a frequency of 100 Hz. When the probe is present in the dielectric layer, the detecting ultrasonic wave is reflected after touching the probe, and then the reflected ultrasonic wave is received by using the ultrasonic receiver, the frequency of the detecting ultrasonic wave may be above 20,000 Hz. The interference of other noises (such as sounds of humans or other objects, etc.) on the ultrasonic touch device is avoided by transmitting ultrasonic waves with a frequency above 20000 Hz. The ultrasonic transmission speed is extremely fast, so that the measurement accuracy, the reaction speed, the anti-interference ability and the like of the touch device can be greatly improved. Also, the distance between the probe and the ultrasonic transceiver is determined by the first position determining unit according to the reflected ultrasonic wave, and a position of the probe in the first coordinate direction of the touch layer (for example, a position in the y-axis direction) is obtained according to said distance. The distance is calculated by: s=c×T/2, where c is a propagation speed of the ultrasonic wave in the dielectric layer such as water or silicone oil. T is a time difference between transmitting and receiving of the ultrasonic wave.

The ultrasonic transmitter transmits the ultrasonic detecting wave to the dielectric layer, and starts timing with the timer 160 at the time of transmitting. The ultrasonic wave propagates in the dielectric layer, and is returned once it contacts the probe. The timer 160 immediately stops when the ultrasonic receiver receives the reflected wave. The propagation speed of the ultrasonic wave in the dielectric layer is known, and according to the time T recorded by the timer 160, the distance of the transmission point from the probe may be calculated.

After the ultrasonic receiver receives the reflected wave, the position of the probe in the second coordinate direction of the touch layer (for example, the position in the x-axis direction) may be determined by the second position determining unit according to the position of the ultrasonic wave ranging unit 145, that receives the reflected ultrasonic wave, in the ultrasonic wave reflection receiver. It should be noted that the position of the ultrasonic wave ranging unit 145 in the ultrasonic transceiver may be a sequential position of the ultrasonic wave ranging unit 145 in the ultrasonic transceiver (the $N^{th}$ ultrasonic wave ranging unit 145 from an origin of coordinates), and may also be a distance position (the distance between the ultrasonic wave ranging unit 145 and the origin of coordinates), which is not particularly limited in this example. The origin of coordinates may be a position of a first ranging unit of the ultrasonic transceiver, or may be a position of a middle ranging unit of the ultrasonic transceiver, which is not particularly limited in this example.

The ultrasonic touch device may further include a communication unit connected with the electronic device and including one or more of wired communication units or wireless communication units, configured to transmit the determined touch position of the probe entering the dielectric layer in the touch layer to the electronic device, so that the electronic device performs an related operation at a corresponding position according to the touch position. The above wireless communication unit may include Bluetooth, Zigbee, Wifi and the like, which is not limited in this example.

In an exemplary arrangement, the touch information includes touch pressure.

In an exemplary arrangement, the ultrasonic wave transceiver 140 may include an ultrasonic transmitter and an ultrasonic receiver. An ultrasonic wave signal transmitted by the ultrasonic transmitter propagates in the dielectric layer. The ultrasonic receiver receives the ultrasonic wave signal propagating through the dielectric layer to obtain the touch pressure according to the ultrasonic wave signal received by the ultrasonic receiver.

The touch information determining module 150 may be connected with the ultrasonic receiver, and the touch information determining module 150 may be configured to process the ultrasonic wave signal received by the ultrasonic receiver to obtain touch pressure, and according to the touch pressure, the ultrasonic touch device is controlled to perform an operation corresponding to the touch pressure.

The working principle of detecting the touch pressure by the ultrasonic wave in the arrangement of the present disclosure is as follows: the ultrasonic transmitter continuously transmits the ultrasonic wave signal, and the ultrasonic receiver receives the ultrasonic wave signal propagating through the dielectric layer. When the dielectric layer is pressed and deformed, ultrasonic intensity is obtained according to the ultrasonic wave signal received by the ultrasonic receiver. The ultrasonic intensity is subtracted from an initial ultrasonic intensity to obtain a change value of the ultrasonic intensity. On the basis of this, a table of pressure levels of corresponding relationships between the change value of the ultrasonic intensity and the touch pressure may be stored in the ultrasonic touch device. By looking up the table, the pressure level corresponding to the change value of the ultrasonic intensity may be obtained, thus realizing the detection of the touch pressure. Also, the pressure level has a one-to-one correspondence with the pressure touch function.

The corresponding relationship between the change value of the ultrasonic intensity and the pressure level may, for example, correspond to a first-order pressure when the change value of the ultrasonic intensity is between a first preset value and a second preset value correspond to a second-order pressure when the change value of the ultrasonic intensity is between the second preset value and a third preset value; correspond to a third-order pressure when the change value of the ultrasonic intensity is between the third preset value and a fourth preset value; and so on. The first preset value is smaller than the second preset value, the second preset value is smaller than the third preset value, and the third preset value is smaller than the fourth preset value. On this basis, by judging the range to which the change value of the ultrasonic intensity belongs, the corresponding pressure level can be obtained.

It should be noted that the initial ultrasonic intensity may be, for example, a factory preset value of the ultrasonic touch device, or may be an initial value of the ultrasonic intensity obtained according to the ultrasonic wave signal received by the ultrasonic receiver when the dielectric layer is not deformed. Secondly, when the ultrasonic intensity is subtracted from the initial ultrasonic intensity, an absolute value of the difference can be taken, so that the change value of the ultrasonic intensity is greater than or equal to zero.

An arrangement of the present disclosure provides an ultrasonic pressure touch device. An ultrasonic wave signal transmitted by an ultrasonic transmitter may propagate in a dielectric layer, and the ultrasonic receiver may receive an ultrasonic wave signal propagating through the dielectric layer. Therefore, when the touch layer is pressed and deformed, the ultrasonic receiver may receive the ultrasonic intensity that changes due to the deformation of the touch layer. The ultrasonic intensity is different according to a pressing force and a contact area of the touch object such as the finger with the touch layer. On the basis of this, the change value of the ultrasonic intensity can be obtained by subtracting the initial ultrasonic intensity from the initial ultrasonic intensity, and the corresponding pressure level can be obtained according to the change value of the ultrasonic intensity, thus realizing the detection of the touch pressure. The corresponding pressure touch function can be realized by controlling the device to perform an operation corresponding to the pressure level.

Since the electromagnetic field signal does not interfere with the intensity of ultrasonic wave signal, the problem of reducing accuracy and sensitivity of the touch pressure detection caused by the electromagnetic field signal interference in the related art can be well solved, and the user experience can be improved.

The ultrasonic touch device provided by the arrangement of the present disclosure is an ultrasonic touch device which is especially suitable for large-size touch and low-cost requirements, and which uses a thin layer of liquid medium as a medium for ultrasonic transmission and defines a position where the finger contacts based on elasticity of the material. At the same time, the ultrasonic wave is used to define a distance, and the ultrasonic wave transceivers are arranged on the frame around the dielectric layer, and the ultrasonic reflection signal is converted into an electrical signal by a signal converter to define the touch position and/or the touch pressure.

The arrangement of the present disclosure further provides a display device including the ultrasonic touch device according to any of the arrangements described above.

In an exemplary arrangement, a size of the display device is greater than a preset value.

The preset value may be defined as greater than 50 inches, but the disclosure is not limited thereto. This is because, the sensitivity requirements depend on the size of the display device, that is, the larger the size of the display device is, the smaller sensitivity will be required.

In an exemplary arrangement, the display device includes a display panel and a casing, and the ultrasonic transmitter and the ultrasonic receiver are disposed between the outer side of the display panel and the casing.

The display panel may be a touch display panel using an In cell mode (the touch panel function is embedded in a liquid crystal pixel), or an On cell mode (the touch panel function may be embedded between a color filter substrate and a polarizer). Of course, it may also be an external touch display panel. The display panel may be a liquid crystal display panel or an organic electroluminescent diode display panel.

Further, a side surface of the display panel is a surface other than a light emitting surface and a light incident surface.

Other arrangements of the present disclosure will be apparent to those skilled in the art when considering the specification and implementing the present disclosure. The present application is intended to cover any variations, uses, or adaptations of the present disclosure, which are in accordance with the general principles of the present disclosure and include common general knowledge or conventional technical means in the art that are not disclosed in the present disclosure. The specification and examples are to be regarded as illustrative only, and the true scope and spirit of the present disclosure is defined by the appended claims.

What is claimed is:

1. A ultrasonic touch device comprising:
   a touch layer having a plurality of probes fixedly disposed on a first side thereof, the plurality of probes being perpendicular to the touch layer;
   an interlayer disposed on the first side of the touch layer, wherein the plurality of probes penetrate the interlayer and extend from a first side of the touch layer to a second side of the interlayer;
   a dielectric layer disposed on the second side of the interlayer; and
   an ultrasonic transceiver disposed at a periphery of the dielectric layer, configured to transmit a detecting ultrasonic wave to the dielectric layer and receive a reflected ultrasonic wave after the detecting ultrasonic wave is reflected.

2. The ultrasonic touch device according to claim 1, wherein the touch layer and the plurality of probes are made of elastic material, and when the second side of the touch layer is pressed, the touch layer is deformed so that at least one of the plurality of probes disposed on the first side of the touch layer enters the dielectric layer, and wherein the first side of the touch layer is opposite to the second side of the touch layer.

3. The ultrasonic touch device according to claim 2, wherein the touch layer is integrally formed with the plurality of probes.

4. The ultrasonic touch device according to claim 1, wherein the plurality of probes are cylinder-shaped.

5. The ultrasonic touch device according to claim 1, wherein the dielectric layer includes a liquid medium.

6. The ultrasonic touch device according to claim 5, wherein the dielectric layer has a thickness of 0.2 mm to 2 mm.

7. The ultrasonic touch device according to claim 6, wherein the liquid medium is water.

8. The ultrasonic touch device according to claim 6, wherein the liquid medium is silicone oil.

9. The ultrasonic touch device according to claim 1, wherein the ultrasonic transceiver comprises a plurality of ultrasonic wave ranging units linearly arranged.

10. The ultrasonic touch device according to claim 1, wherein the ultrasonic transceiver comprises a plurality of ultrasonic wave ranging units arranged in a matrix.

11. The ultrasonic touch device according to claim 1, further comprising a touch information determining module and a timer, wherein the ultrasonic transceiver transmits the detecting ultrasonic wave to the dielectric layer in response to the touch layer being pressed, and at the same time, the timer starts timing; when the ultrasonic transceiver receives the reflected ultrasonic wave reflected by the plurality of probes in the dielectric layer, the timer stops timing, and the touch information determining module calculates a position of the plurality of probes in the dielectric layer according to the timing to determine a pressed position.

12. The ultrasonic touch device according to claim 11, wherein the touch information determining module comprises a first position determining unit and a second position determining unit, respectively configured to determine a position of the plurality of probes entering the dielectric layer in a first direction and a second direction according to a position of the ultrasonic wave ranging unit in the ultrasonic transceiver, which receives the reflected ultrasonic wave, the first direction and the second direction being perpendicular to each other in a plane of the dielectric layer.

13. The ultrasonic touch device according to claim 1, wherein the ultrasonic transceiver comprises: a first ultrasonic transceiver unit and a second ultrasonic transceiver unit, wherein the first ultrasonic transceiver unit and the second ultrasonic transceiver unit are respectively disposed on two adjacent sides of the dielectric layer.

14. The ultrasonic touch device according to claim 13, further comprising a touch information determining module and a timer, wherein the first ultrasonic transceiver unit and the second ultrasonic transceiver unit transmits the detecting ultrasonic wave to the dielectric layer in response to the touch layer being pressed, and at the same time, the timer starts timing; when the first ultrasonic transceiver unit and the second ultrasonic transceiver unit receive the reflected ultrasonic wave reflected by the plurality of probes entering in the dielectric layer, the timer stops timing, and the touch information determining module calculates a position of the plurality of probes in the dielectric layer according to the timing to determine a pressed position.

15. The ultrasonic touch device according to claim 1, further comprising: a touch information determining module configured to determine touch information according to the detecting ultrasonic wave and the reflected ultrasonic wave.

16. The ultrasonic touch device according to claim 1, wherein the interlayer is made of organics.

17. A display device, comprising:
an ultrasonic touch device, wherein the ultrasonic touch device comprises:
- a touch layer having a plurality of probes fixedly disposed on a first side thereof, the plurality of probes being perpendicular to the touch layer;
- an interlayer disposed on the first side of the touch layer, wherein the plurality of probes penetrate the interlayer and extend from a first side of the touch layer to a second side of the interlayer;
- a dielectric layer disposed on the second side of the interlayer; and
- an ultrasonic transceiver disposed at a periphery of the dielectric layer, configured to transmit a detecting ultrasonic wave to the dielectric layer and receive a reflected ultrasonic wave after the detecting ultrasonic wave is reflected.

18. The display device according to claim 17, wherein the ultrasonic transceiver comprises a plurality of ultrasonic wave ranging units linearly arranged; and
the display device has a size greater than 50 inches.

* * * * *